(12) United States Patent
Yu et al.

(10) Patent No.: US 11,354,522 B2
(45) Date of Patent: Jun. 7, 2022

(54) METHOD AND SYSTEM FOR OBTAINING WIRE INFORMATION

(71) Applicant: NANNING FUGUI PRECISION INDUSTRIAL CO., LTD., Nanning (CN)

(72) Inventors: Zhi-Cheng Yu, Shenzhen (CN); Xin-Yue Lin, Nanning (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 91 days.

(21) Appl. No.: 16/862,846

(22) Filed: Apr. 30, 2020

(65) Prior Publication Data
US 2021/0294992 A1   Sep. 23, 2021

(30) Foreign Application Priority Data

Mar. 20, 2020   (CN) .......................... 202010201919.2

(51) Int. Cl.
| | | |
|---|---|---|
| *G06K 7/08* | (2006.01) | |
| *G06K 7/10* | (2006.01) | |
| *G06K 19/07* | (2006.01) | |

(52) U.S. Cl.
CPC ..... *G06K 7/10366* (2013.01); *G06K 7/10316* (2013.01); *G06K 19/0723* (2013.01)

(58) Field of Classification Search
CPC ... A61B 5/0002; A61B 5/6833; A61B 5/1432; G16Z 99/00
USPC ............................................. 235/451, 462.46
See application file for complete search history.

(56) References Cited

U.S. PATENT DOCUMENTS

| | | | | |
|---|---|---|---|---|
| 9,337,903 | B2 * | 5/2016 | Smith | .................. H04B 5/0075 |
| 2011/0248833 | A1 * | 10/2011 | Ritamaki | ........... G06K 19/0705 |
| | | | | 340/10.33 |

FOREIGN PATENT DOCUMENTS

CN   206292303 U   6/2017

* cited by examiner

*Primary Examiner* — Daniel St Cyr
(74) *Attorney, Agent, or Firm* — ScienBiziP, P.C.

(57) ABSTRACT

A method and system for obtaining wire information, includes a RFID tag, a RFID reader, and a data center. The RFID tact obtains the sensing information of the wire and transmits the sensing information and identification information of the RFID tag. The RFID reader transmits high-frequency electromagnetic waves to trigger the RFID tact and transmits and receives sensing information and identification information sent by the RFID tag. The data center is communicatively connected with the RFID reader and determines the type of the received sensing information based on the received sensing information and identification information for data analysis.

10 Claims, 7 Drawing Sheets

METHOD AND SYSTEM FOR OBTAINING WIRE INFORMATION

FIELD

The subject matter herein generally relates to a technique for obtaining information on wire current and surrounding environment of the wire, and particularly relates to a passive wireless method for collecting wire current and temperature and humidity data. Electromagnetic induction coupling to transmit electrical energy and data without installing a battery and detecting current through non-contact coupling to avoid direct contact with a wire.

BACKGROUND

A commonly used current measurement is a Hall current sensor. Based on the magnetic balance Hall principle, the current is passed from the control circuit end of the Hall element and a magnetic field of magnetic induction intensity is applied to the normal direction of the control plane on the Hall element. The direction of the current and magnetic field will generate an electromotive force, the magnitude of which is proportional to the control current. However, the disadvantage of the Hall current sensor is that the size of the device is large and the processing circuit is not integrated, which is not only difficult to install, but also unable to measure the temperature and humidity while measuring the current.

SUMMARY

In the present invention discloses a method and system for obtaining wire information which uses electromagnetic induction coupling to transmit electrical energy and data. The RFID tag is designed as a wire clip to be easily fixed on the wire to be tested.

A method for obtaining wire information includes emitting high-frequency electromagnetic waves to trigger a radio frequency identification (REID) tag by a RFID reader. The RFID tag transmits a notice signal to the REID reader to ask the RFID reader to pause to emit the high-frequency electromagnetic waves. The RFID tag obtains data of a sensor of the wire. The data of the sensor includes current, temperature, and humidity. The REID tag transmits the data of the sensor and an identification of the REID tag to the RFID reader. The REID reader resumes transmitting the high-frequency electromagnetic waves after receiving the data of the sensor. A data center is connected by communication with the RFID reader. The RFID reader transmits the data of the sensor and the identification of the RFID tag to a data center. The data center analysis a classification of the data of the sensor according to the identification of the RFID tag.

A system for obtaining wire information comprises a RFID tag, a RFID reader, a data center. A RFID tag obtains a data of sensor of wire. A RFID transmits the data of the sensor, an identification of the RFID tag. The data of the sensor includes current, temperature, and humidity. A RFID reader emits high-frequency electromagnetic waves to trigger the RFID tag and receives the data of the sensor, the identification of the RFID tag. A data center is connected by communication with the RFID reader. The data center receives the data of sensor and the identification of the RFID tag. The data center analysis a classification of the data of the sensor according to the identification of the RFID tag.

BRIEF DESCRIPTION OF THE DRAWINGS

Implementations of the present technology will now be described, by way of embodiment, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the disclosure.

Several definitions that apply throughout this disclosure will now be presented.

The term "coupled" is defined as connected, whether directly or indirectly through intervening components, and is not necessarily limited to physical connections. The connection may be such that the objects are permanently connected or releasably connected. The term "substantially" is defined to be essentially conforming to the particular dimension, shape, or other feature that the term modifies, such that the component need not be exact. The term "comprising," when utilized, is "including, but not necessarily limited to"; it specifically indicates open-ended inclusion or membership in the so-described combination, group, series, and the like. References to "an" or "one" embodiment in this disclosure are not necessarily to the same embodiment, and such references mean "at least one."

Figure 1:
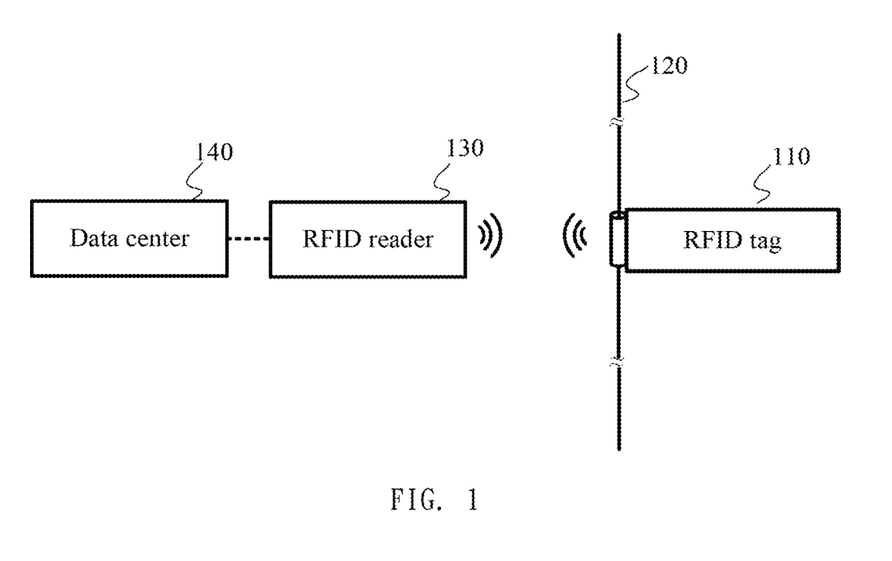
FIG. 1 is a system architecture diagram according to an embodiment of the disclosure.

FIG. 1 illustrates a system architecture diagram according to an embodiment of the disclosure. As shown in FIG. 1, wire information obtaining system 100 includes an RFID tag 110, a wire 120, a RFID reader 130, and a data center 140. The RFID tag 110 clamps the wire 120 in a form of a clip. The RFID tag 110 includes a coil antenna, when the clip of the RFID tag 110 clamps the wire 120 the direction of the magnetic field line radiated by the wire 120 is the same as the plane direction of the coil antenna vertically. Sensing information of the wire 120 is obtained by the wireless method of electromagnetic induction. The RFID reader 130 emits high-frequency electromagnetic waves to trigger the RFID tag 110. The RFID tag 110 sends an encoding command to pause the RFID reader 130 when the RFID tag 110 starts to operate. The RFID tag 110 generates an electromagnetic force according to sensing the electromagnetic wave radiation by the wire 120. The RFID tag 110 obtains a current of the wire 120 according to the electromagnetic wave radiation of the wire 120. The RFID tag 110 obtains environment sensing information such as temperature and humidity according to a temperature and humidity sensor in the RFID tag 110. The RFID tag 110 sends the current, the temperature, the humidity, and an identification of the RFID tag 110 to the RFID reader 130. The data center 140 is connected by communication with the RFID reader 130. The communicating connection includes Ethernet, 4G, 5G, Wi-Fi, and blue tooth. The RFID reader 130 sends the current, the temperature, the humidity, and the identification from the RFID tag 110 to the data center 140. The data center determines the type of sensing information based on the identification information and performs further classification and analysis.

Figure 2:
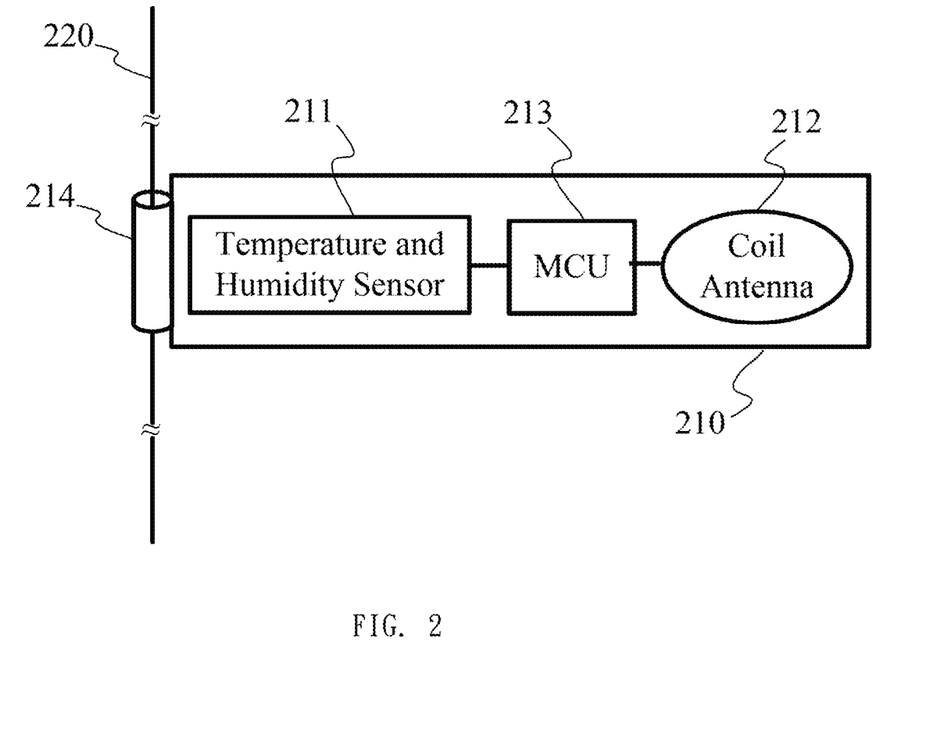
FIG. 2 is a structure diagram of an RFID tag according to an embodiment of the disclosure.
Figure 3:
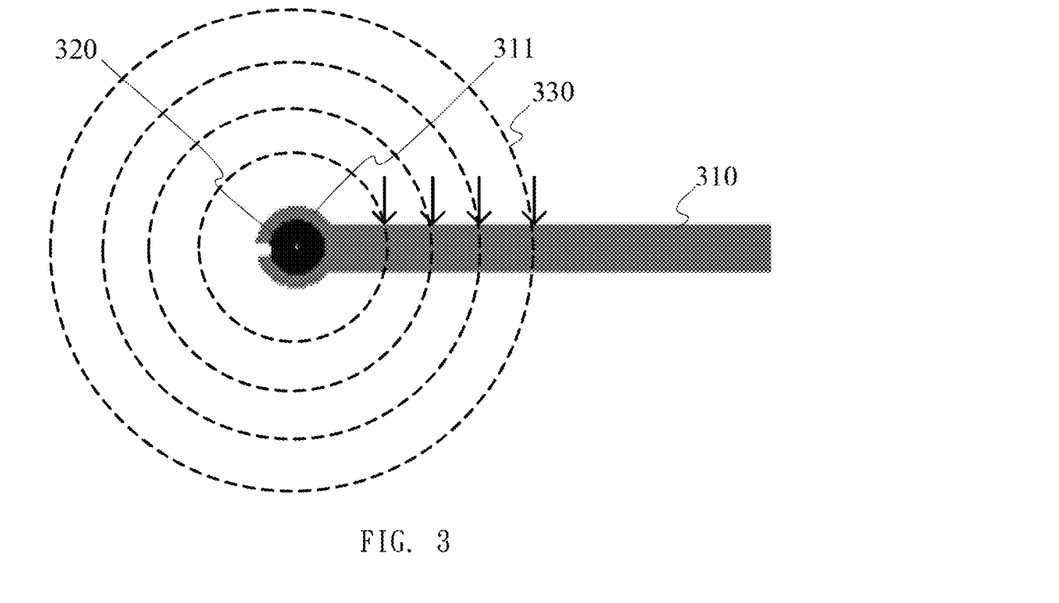
FIG. 3 is a side view showing an RFID tag clamp according to an embodiment of the disclosure.

FIG. 2 illustrates a structure diagram of an RFID tag according to an embodiment of the disclosure. As shown in FIG. 2, a RFID tag 210 includes a temperature and humidity sensor 211, a coil antenna 212, a microprocessor 213, and a clip 214. The RFID tag 210 clamps a wire 220 by the clip 214. The clip 214 in FIG. 2 is only a schematic diagram of the wire that can be clamped. The actual structure of the clip 214 is shown in FIG. 3. The temperature and humidity sensor 211 is disposed on the side close to the wire 220 as possible to obtain sensing information of temperature and humidity of a surrounding environment of the wire 220. The microprocessor 213 is electrically connected to the temperature and humidity sensor 211. The temperature and humidity sensor 211 transmits the collected the sensing information of temperature and humidity to the microprocessor 213. The microprocessor 213 is electrically connected to the coil antenna 212. The coil antenna 212 is used to transmit and receive electromagnetic waves. The coil antenna 212 receives a high-frequency electromagnetic wave which is emitted from the RFID reader. The coil antenna 212 couples out a first induced electromotive force to generate a trigger signal for driving the RFID tag 210. The coil antenna 212 also receives electromagnetic which is radiated from the wire 220 to couple out a second induced electromotive force. The current information is generated by capturing the electromagnetic wave of the wire 220. The sensing information of temperature and humidity and the information of the wire 220 are obtained by the microprocessor 213. The microprocessor 213 transmits the sensing information of temperature and humidity, the information of the wire 220, and the identification of the RFID tag to the RFID reader by wireless communication.

FIG. 3 illustrates a side view showing an RFID tag clamp according to an embodiment of the disclosure. As shown in FIG. 3, a RFID tag 310 has a clip 311 on one side. The clip 311 is a wedge-shaped clip with a notch and can be directly clipped on a wire 320. A coil antenna is provided in the RFID tag 310. The plane formed by the coil antenna is parallel to the wire 320 when the clip 311 clamps the wire 320. The wire 320 described in FIG. 3 is represented by a cross-sectional angle, wherein the normal direction of the plane formed by the coil antenna is orthogonal to the extending direction of the wire 320 and the electromagnetic wave generated by the wire 320 is represented by magnetic force lines 330 as shown in FIG. 3. The magnetic force lines 330 enter the plane of the RFID tag 310 vertically (as shown by the direction of the arrow in FIG. 3) and the magnetic force lines 330 is perpendicular to the plane formed by the coil antenna in the RFID tag 310. Thus the coil antenna of the RFID tag 310 can get the maximum magnetic flux.

Figure 4:
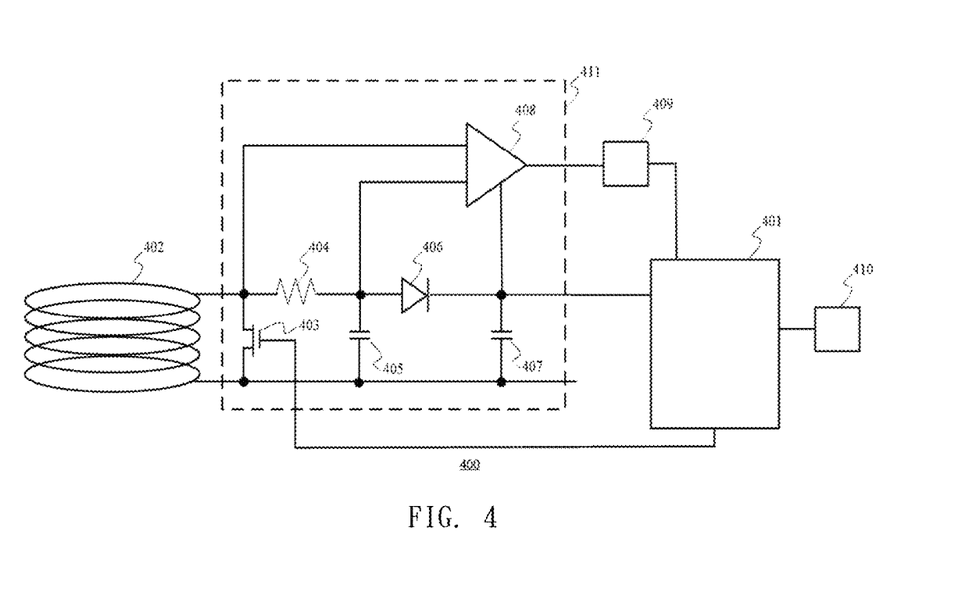
FIG. 4 is a circuit diagram of an RFID tag according to an embodiment of the disclosure.

FIG. 4 illustrates a circuit diagram of an RFID tag according to an embodiment of the disclosure. As shown in FIG. 4, a circuit of a RFID tag 400 includes a microprocessor 401, a coil antenna 402, a transistor 403, a resistor 404, a first capacitor 405, a diode 406, a second capacitor 407, an amplifier 408, an analog/digital converter 409, and a temperature and humidity sensor 410. The transistor 403, the resistor 404, the first capacitor 405, the diode 406, the second capacitor 407, and the amplifier 408 constitute an amplifier circuit 411. The coil antenna 402 in the RFID tag 400 couples the RFID reader and receives the electromagnetic wave emitted by the wire to be tested to induce a charge. The charge is stored in the first capacitor 405. The charge is transferred to the second capacitor 407 from the first capacitor 405 when the charge in the first capacitor 405 is more than the second capacitor 407. The microprocessor 401 is triggered when the second capacitor 407 reaches a certain voltage. After the microprocessor 401 be triggered, the microprocessor 401 transmits an encoding command to pause the RFID reader sending high-frequency electromagnetic waves. At this time, the coil antenna 402 on the RFID tag 400 can only sense the electromagnetic waves generated by the wire radiation. The first capacitor 405 is charged according to the second induced electromotive force through the coil antenna. Therefore, the voltage is generated to the resistor 404 and the microprocessor 401 obtains the voltage on the resistor 404. The microprocessor 401 calculates the current according to the voltage and a known resistor value of the resistor 404. The temperature and humidity sensor 410 is electrically connected to the microprocessor 401. The temperature and humidity sensor 410 transmits the information of temperature and humidity to the microprocessor 401. The microprocessor 401 transmits the identification of the RFID tag 400, the voltage measured by the resistor 404, and the information of temperature and humidity to the RFID reader. The RFID reader resumes emitting high-frequency electromagnetic waves after the RFID reader receives the identification of the RFID tag 400, the voltage measured by the resistor 404, and the information of temperature and humidity. At the same time, the RFID reader obtains a corresponding number and data of the RFID tag 400, thereby monitoring the current, temperature, and humidity of the wire.

Figure 5:
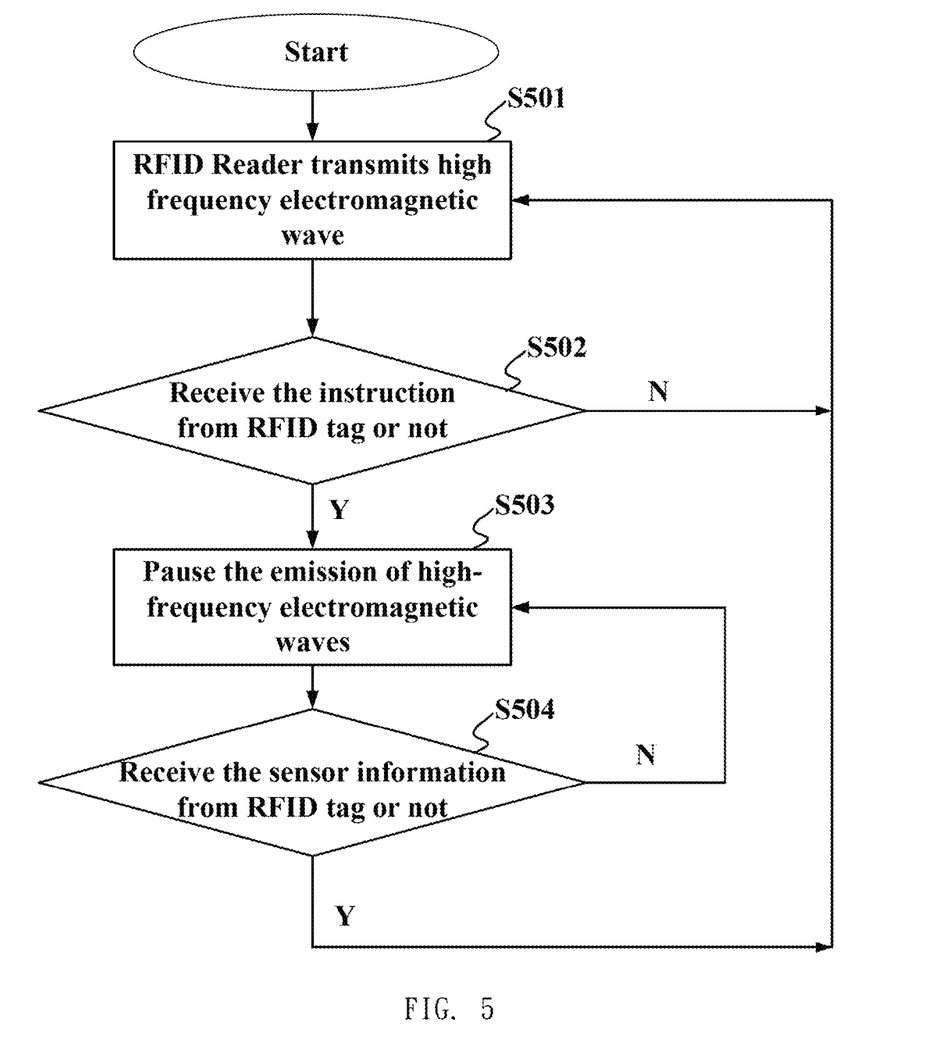
FIG. 5 is a flowchart of the operation of the RFID reader according to an embodiment of the disclosure.

FIG. 5 illustrates a flowchart of the operation of the RFID reader according to an embodiment of the disclosure. As shown in FIG. 5, in step S501, the RFID reader emits high-frequency electromagnetic waves, thereby triggering the RFID tag that receives the high-frequency electromagnetic waves. In step S502, it is determined whether the RFID reader receives the encoding command be transmitted from the RFID tag. The high-frequency electromagnetic waves are continuously emitted in step 1 when the RFID reader does not receive the encoding command from the RFID tag. After receiving the encoding command be transmitted from the RFID tag executes step S503. In step S503, the high-frequency electromagnetic waves are suspended to transmit. In step S504, it is determined whether the RFID reader receives the sensing information. The RFID reader executes step S503 pause the emission of high-frequency electromagnetic waves when the RFID does not receive the sensing information. The RFID reader resumes emitting high-frequency electromagnetic waves when the RFID reader receives the sensing information.

Figure 6:
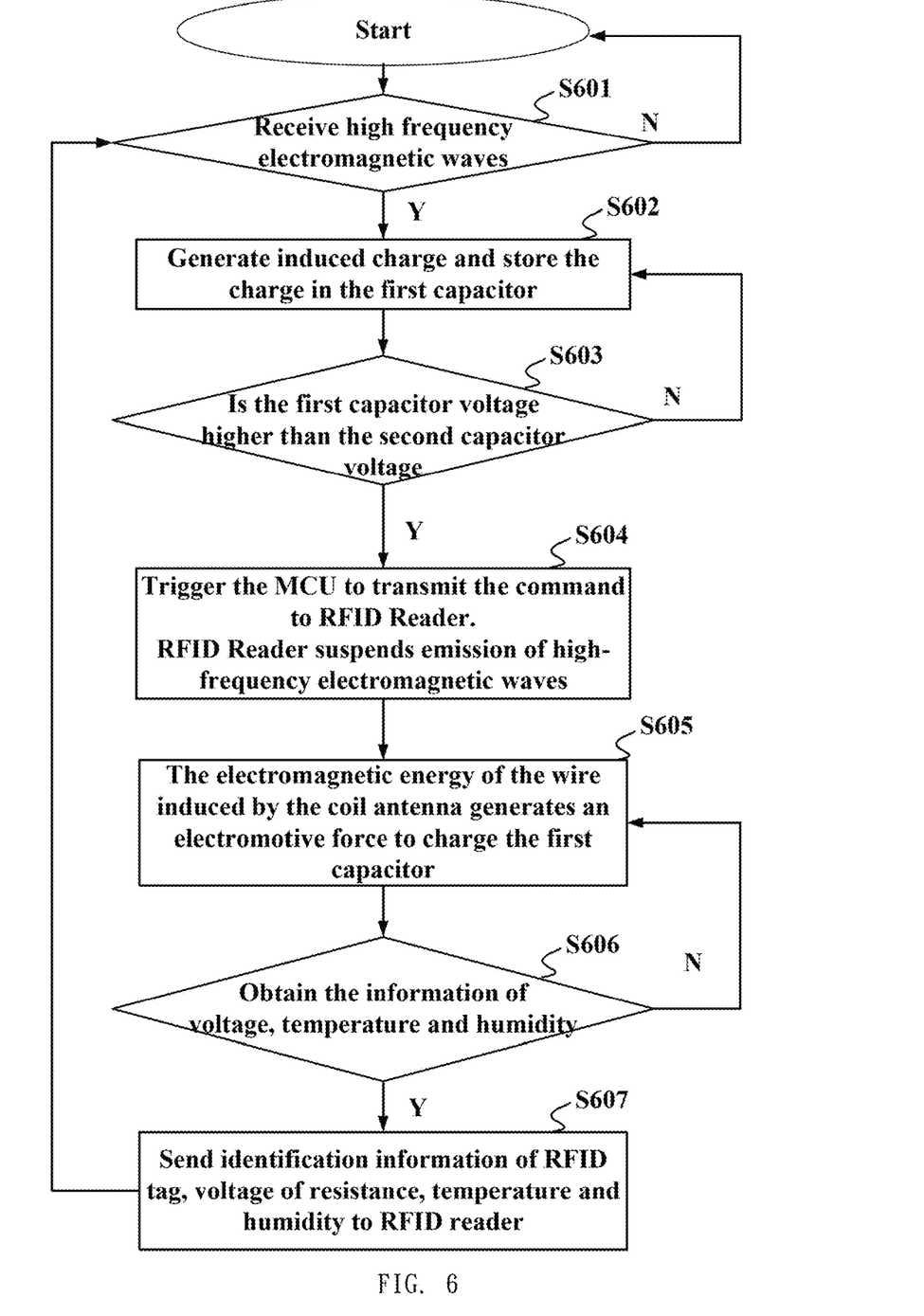
FIG. 6 is a flowchart of the operation of the RFID tag according to an embodiment of the disclosure.

FIG. 6 illustrates a flowchart of the operation of the RFID tag according to an embodiment of the disclosure. As shown in FIG. 6, in block S601, the RFID tag determines whether a high-frequency electromagnetic wave is received. The RFID tag continuously waits the high-frequency electromagnetic waves when the RFID tag does not receive the high-frequency electromagnetic waves. After receiving the high-frequency electromagnetic waves the RFID tag executes block S602. In block S602, a coil antenna of the RFID tag is induced by high-frequency electromagnetic waves to generate induced charges. The generated induced charges are stored in a first capacitor in the RFID tag. In block S603, the voltage in the first capacitor is compared with the voltage in the second capacitor. The induced charges are continuously stored in the first capacitor when the voltage in the first capacitor is less than the voltage in a second capacitor. The voltage in the first capacitor is higher than the voltage in the second capacitor executes block S604. In block S604, the microprocessor is triggered when the voltage in the first capacitor higher than the voltage in the second capacitor. The microprocessor sends the encoding command to pause the RFID reader emits the high-frequency electromagnetic waves. In block S605, the RFID reader has been notified to pause emitting high-frequency electromagnetic waves, the coil antenna in the RFID tag will charge the first capacitor according to the induced electromotive force generated by the electromagnetic energy around the wire. A voltage will be generated on a resistance. In block S606, checking whether the microprocessor obtains the information of voltage, temperature, and humidity or not. The first capacitor is continuously charged when the microprocessor does not obtain the information of voltage, temperature, and humidity. After obtaining the information of voltage, temperature, and humidity, the microprocessor executes block S607. In block S607, the RFID tag sends its own identification information, voltage of the resistance, temperature, and humidity to the RFID reader.

Figure 7:
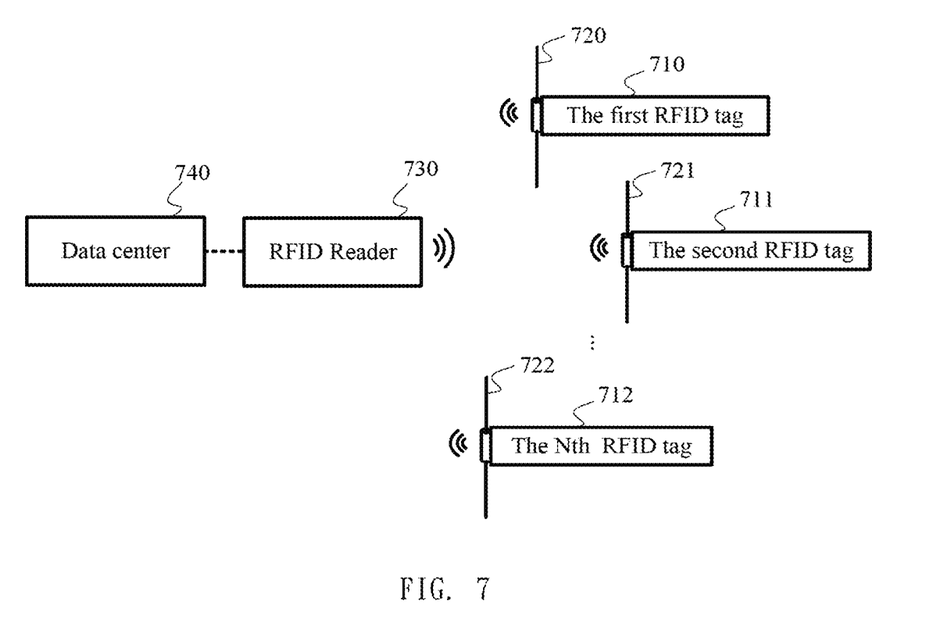
FIG. 7 is a diagram of the application scenario of a wire information acquisition system according to an embodiment of the disclosure.

FIG. 7 illustrates a diagram of the application scenario of a wire information acquisition system according to an embodiment of the disclosure. As shown in FIG. 7, the embodiment includes a first RFID tag 710, a second RFID tag 711, an Nth RFID tag 712, a first wire 720, a second wire 721, an Nth wire 722, a RFID reader 730 and a data center 740. The embodiment is provided with a plurality of RFID tags for measuring information of wires at different positions, wherein the first RFID tag 710 is used for measuring a first information of the first wire 720, the second RFID tag 711 is used for measuring a second information of the second wire 721, the Nth RFID tag 712 is used for measuring an Nth information of the Nth wire 722. The first RFID tag 710 sends the first information of the first wire 720 and a first identification information of the first RFID tag 710 to the RFID reader 730. The second RFID tag 711 sends the second information of the second wire 721 and a second identification information of the second RFID tag 711 to the RFID reader 730. The Nth RFID tag 712 sends the Nth information of the Nth wire 722 and an Nth identification information of the Nth RFID tag 712 to the RFID reader 730. The RFID reader 730 sends the information of wires and the corresponding RFID tag identification information to the data center 740. The data center 740 can determine which RFID tag comes from and the type of wire information (current, voltage, temperature, humidity) according to a code of the identification information. The data center 740 can perform corresponding data analysis based on the wire information and provide it to the user. For example, analyzing electricity consumption according to compare current information collected by the first RFID tag 710, the second RFID tag 711, and the Nth RFID tag 712. Abnormal temperature and humidity are detected can distinguish from which RFID tag is returned to notify the administrator to eliminate the abnormally according to the location of the RFID tags.

The embodiments shown and described above are only examples. Therefore, many details of such art are neither shown nor described. Even though numerous characteristics and advantages of the technology have been set forth in the foregoing description, together with details of the structure and function of the disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A method for obtaining wire information, comprising:
emitting high-frequency electromagnetic waves to trigger a radio frequency identification (RFID) tag by a RFID reader;
transmitting a notice signal to the RFID reader by the RFID tag to ask the RFID reader pause to emit the high-frequency electromagnetic waves;
obtaining a data of sensor of the wire by the RFID tag, the data of sensor includes current, temperature and humidity;
transmitting the data of sensor and an identification of the RFID tag to the RFID reader by the RFID tag;
resuming the transmit of the high-frequency electromagnetic waves after receiving the data of sensor by RFID reader;
transmitting the data of sensor and the identification of the RFID tag to a data center according to a communicating connection between the RFID reader and the data center; and
analyzing a classification of the data of sensor according to the identification of the RFID tag by the data center;
wherein the RFID tag comprises:
a clip clamping to the wire;
a sensor of temperature and humidity to obtaining temperature and humidity;
a coil antenna receiving the high-frequency electromagnetic waves which are emitted from the RFID reader, receiving electromagnetic waves of the wire, transmitting the data of sensor and the identification of the RFID tag, coupling a first induced electromotive force according to the high-frequency electromagnetic and coupling a second induced electromotive force according to the electromagnetic waves of the wire;
an amplifying circuit electrically connecting with the coil antenna, generating a notice signal according to the first induced electromotive force and generating the wire information according to the second induced electromotive force; and
a microprocessor coupling with the sensor of temperature and humidity, the microprocessor asking the RFID reader pause to emit the high-frequency electromagnetic waves according to the notice signal by the coil antenna, obtaining the current according to the amplifying circuit and generating the data of sensor according to the temperature, the humidity and the current; and the amplifying circuit comprises a transistor, a resistor, a first capacitor, a diode, a second capacitor, and an amplifier, the coil antenna generates a charge according to the first induced electromotive force and stores the charge in the first capacitor, the first capacitor transfers the charge in the first capacitor to the second capacitor when the charge in the first capacitor is greater than a charge in the second capacitor, the notice signal is generated when the second capacitor reaches a certain voltage, the coil antenna couples the second induced electromotive force after the RFID reader pauses emitting the high-frequency electromagnetic waves, the coil antenna charges the first capacitor according to the second induced electromotive force to generate a voltage on the resistor, the microprocessor obtains the voltage on the resistor and calculates the current according to the voltage on the resistor and a known resistor value of the resistor.

2. The method for obtaining wire information as claimed in claim 1, wherein a plane formed by the coil antenna is parallel to the wire, a normal direction of the plane is orthogonal to an extending direction of the wire, and magnetic force lines of the electromagnetic wave of the wire is perpendicular to the plane.

3. The method for obtaining wire information as claimed in claim 2, further comprising distinguish the classification of the data of sensor according to an identification code, wherein the identification of the RFID tag includes a number of the RFID tag and the identification code of the data of sensor.

4. The method for obtaining wire information as claimed in claim 2, wherein the communicating connection includes Ethernet, 4G, 5G, Wi-Fi, or blue tooth.

5. The method for obtaining wire information as claimed in claim 2, further comprising:
  obtaining a first wire information by a first RFID tag and transmitting the first wire information and a first identification of the first RFID tag;
  obtaining a second wire information by a second RFID tag and transmitting the second wire information and a second identification of the second RFID tag;
  receiving the first wire information, the first identification, the second wire information and the second identification by the RFID reader, and transmitting the first wire information, the first identification, the second wire information and the second identification to the data center; and
  distinguishing the first wire information from the first RFID tag according to the first identification, the second wire information from the second RFID tag according to the second identification by the data center.

6. A system for obtaining wire information, comprising:
  a RFID tag obtaining a data of sensor of wire and transmits the data of sensor, a identification of the RFID tag, wherein the data of sensor includes current, temperature and humidity;
  a RFID reader emitting high-frequency electromagnetic waves to trigger the RFID tag, and receives the data of sensor, the identification of the RFID tag; and
  a data center connecting by communication with the RFID reader, the data center receives the data of sensor and the identification of the RFID tag and analysis a classification of the data of sensor according to the identification of the RFID tag;
  wherein the RFID tag comprises:
    a clip clamping to the wire;
    a sensor of temperature and humidity to obtaining temperature and humidity;
    a coil antenna receiving the high-frequency electromagnetic waves which are emitted from the RFID reader, receiving electromagnetic waves of the wire, transmitting the data of sensor and the identification of the RFID tag, coupling a first induced electromotive force according to the high-frequency electromagnetic and coupling a second induced electromotive force according to the electromagnetic waves of the wire;
    an amplifying circuit electrically connecting with the coil antenna, generating a notice signal according to the first induced electromotive force and generating the wire information according to the second induced electromotive force; and
    a microprocessor coupling with the sensor of temperature and humidity, the microprocessor asking the RFID reader pause to emit the high-frequency electromagnetic waves according to the notice signal by the coil antenna, obtaining the current according to the amplifying circuit and generating the data of sensor according to the temperature, the humidity and the current; and
  the amplifying circuit comprises a transistor, a resistor, a first capacitor, a diode, a second capacitor, and an amplifier, the coil antenna generates a charge according to the first induced electromotive force and stores the charge in the first capacitor, the first capacitor transfers the charge in the first capacitor to the second capacitor when the charge in the first capacitor is greater than a charge in the second capacitor, the notice signal is generated when the second capacitor reaches a certain voltage, the coil antenna couples the second induced electromotive force after the RFID reader pauses emitting the high-frequency electromagnetic waves, the coil antenna charges the first capacitor according to the second induced electromotive force to generate a voltage on the resistor, the microprocessor obtains the voltage on the resistor and calculates the current according to the voltage on the resistor and a known resistor value of the resistor.

7. The system for obtaining wire information as claimed in claim 6, wherein a plane formed by the coil antenna is parallel to the wire, a normal direction of the plane is orthogonal to an extending direction of the wire, and magnetic force lines of the electromagnetic wave of the wire is perpendicular to the plane.

8. The system for obtaining wire information as claimed in claim 7, wherein the identification of the RFID tag includes a number of the RFID tag, an identification code of the data of sensor, distinguish the classification of the data of sensor according to the identification code.

9. The system for obtaining wire information as claimed in claim 7, wherein the communicating connection includes Ethernet, 4G, 5G, Wi-Fi, and blue tooth.

10. The system for obtaining wire information as claimed in claim 7, further comprising:
  a first RFID tag obtaining a first wire information, and transmitting the first wire information and a first identification of the first RFID tag;
  a second RFID tag obtaining a second wire information, and transmitting the second wire information and a second identification of the second RFID tag;
  the RFID reader receiving the first wire information, the first identification, the second wire information and the second identification;

the RFID reader transmitting the first wire information, the first identification, the second wire information and the second identification to the data center; and the data center distinguishing the first wire information from the first RFID tag according to the first identification, the second wire information from the second RFID tag according to the second identification.

* * * * *